United States Patent
Ogimoto et al.

(10) Patent No.: US 6,556,026 B2
(45) Date of Patent: Apr. 29, 2003

(54) FLUID DYNAMIC BEARING EVALUATING METHOD CAPABLE OF QUANTITATIVELY EVALUATING CLEARANCE BETWEEN ROTATING MEMBER AND FIXED MEMBER IN OPERATION

(75) Inventors: Takeharu Ogimoto, Ikoma-gun (JP); Takeshi Takahashi, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/902,753

(22) Filed: Jul. 12, 2001

(65) Prior Publication Data

US 2002/0005727 A1 Jan. 17, 2002

(30) Foreign Application Priority Data

Jul. 13, 2000 (JP) .................................. 2000-212684

(51) Int. Cl.[7] .............................................. G01M 15/00
(52) U.S. Cl. ...................................... 324/698; 324/691
(58) Field of Search ........................... 324/698, 691, 324/693, 694; 73/10; 204/433; 384/100, 12

(56) References Cited

U.S. PATENT DOCUMENTS 4,109,506 A * 8/1978 Bassoli et al. .................. 73/10
4,791,374 A * 12/1988 Yodice et al. ................ 204/433

FOREIGN PATENT DOCUMENTS

| EP | 1 094 104 | 4/2001 |
| JP | 2001-115180 | 4/2001 |

* cited by examiner

*Primary Examiner*—Christine Oda
*Assistant Examiner*—Vincent Q. Nguyen
(74) *Attorney, Agent, or Firm*—Nixon & Vanderhye, P.C.

(57) ABSTRACT

There is provided a fluid dynamic bearing evaluating method capable of quantitatively observing a clearance between a shaft 3 and a housing 2 in an operating state and evaluating a fluid dynamic bearing 1 more in detail. This fluid dynamic bearing evaluating method is to evaluate the fluid dynamic bearing 1 by filling a space between the housing 2 and the shaft 3 with an uncharged lubricant, flowing a current through between the housing 2 and the shaft 3 and measuring an electrical resistance value of the fluid dynamic bearing 1 including the lubricant. According to this evaluating method, the lubricant placed between the housing 2 and the shaft 3 is not electrically charged, and therefore, the measured electrical resistance value has a correlation with the clearance between the housing 2 and the shaft 3, and the clearance can be quantitatively observed by this electrical resistance value.

9 Claims, 1 Drawing Sheet

FLUID DYNAMIC BEARING EVALUATING METHOD CAPABLE OF QUANTITATIVELY EVALUATING CLEARANCE BETWEEN ROTATING MEMBER AND FIXED MEMBER IN OPERATION

BACKGROUND OF THE INVENTION

The present invention relates to a fluid dynamic bearing evaluating method for measuring a clearance of a fluid dynamic bearing by an electrical method.

A conventional fluid dynamic bearing evaluating method flows a current between a fixed member and a rotating member in a rotating state in a state, a space between the fixed member and the rotating member having been filled with an oil (lubricating fluid). The electrifying state of the fluid dynamic bearing is measured by a change in voltage.

According to the aforementioned conventional fluid dynamic bearing evaluating method, it can be determined whether the rotating member and the fixed member are in a contact state or in a noncontact state. However, a clearance between the rotating member and the fixed member cannot be quantitatively determined, and therefore, the characteristics of the fluid dynamic bearing cannot be clearly determined.

SUMMARY OF THE INVENTION

Accordingly, an object of the present invention is to provide a fluid dynamic bearing evaluating method capable of quantitatively determining the clearance between the rotating member and the fixed member in an operating state and determining the characteristics of the fluid dynamic bearing more in detail in the operating state.

In order to achieve the aforementioned object, the present invention provides a fluid dynamic bearing evaluating method for evaluating a fluid dynamic bearing, comprising the steps of:

filling a space between a fixed member and a rotating member with an uncharged lubricant, flowing a current between the fixed member and the rotating member and measuring an electrical resistance value of the fluid dynamic bearing including the lubricant.

According to the present invention, the lubricant placed between the fixed member and the rotating member is not electrically charged. Therefore, the electrical resistance value measured in the operating state has a correlation with the clearance between the fixed member and the rotating member, and the clearance can be quantitatively determined by this electrical resistance value.

Moreover, perpendicularity of an axial bearing surface of the fixed member and an axial bearing surface of the rotating member in the operating state also has a correlation with the electrical resistance value. Therefore, the perpendicularity of the axial bearing surfaces can be quantitatively evaluated by this electrical resistance value. Moreover, the resistance value of the lubricant increases when the lubricant is deteriorated by oxidation, and therefore, the degree of deterioration of the lubricant can be quantitatively evaluated by the electrical resistance value.

Therefore, according to the fluid dynamic bearing evaluating method of the present invention, the operating state of the fluid dynamic bearing can be evaluated more in detail.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1A:
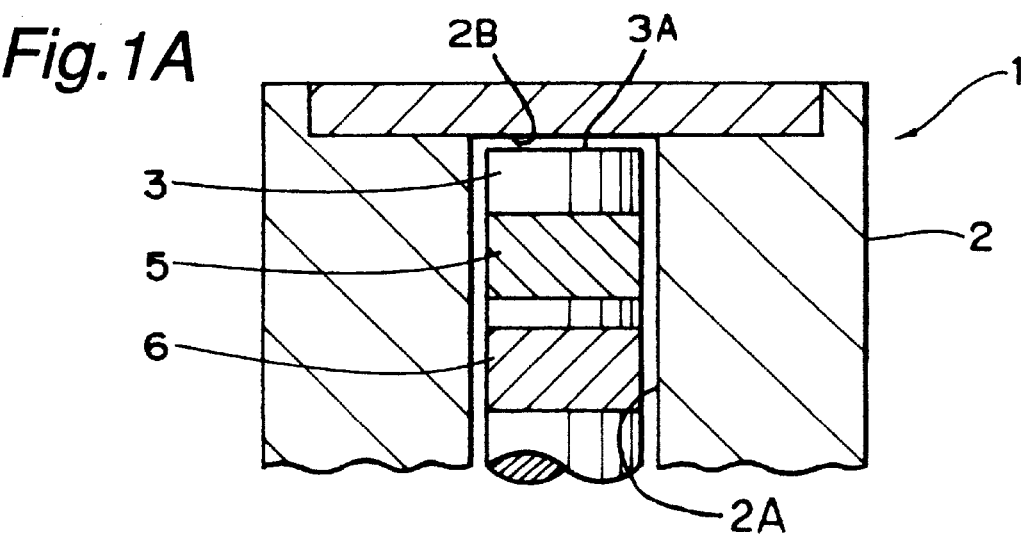
FIG. 1A is a sectional view of the essential part of a fluid dynamic bearing to be tested by a fluid dynamic bearing evaluating method of one embodiment of the present invention.

The present invention will be described in detail below on the basis of the embodiment thereof shown in the drawings.

According to this embodiment, a fluid dynamic bearing 1 as shown in FIG. 1A is evaluated. In this fluid dynamic bearing 1, a shaft 3 (i.e., a rotating member) is inserted into a housing 2 (i.e., a fixed member), and dynamic pressure grooves 5 and 6 are formed on the outer peripheral surface of this shaft 3. A space between the housing 2 and the shaft 3 is filled with a conductive oil (not shown) that is not electrically charged. The conductive oil serves as a lubricant (dynamic pressure generating fluid). This conductive oil comprises an ester-based base oil, an anionic antistatic agent and an amine-based antioxidant. More in detail, the ester-based base oil was provided by 97.5 percent by weight of dioctyl sebacate, and the anionic antistatic agent was provided by 1.0 percent by weight of alkyl aryl sulfonate.

Figure 1B:
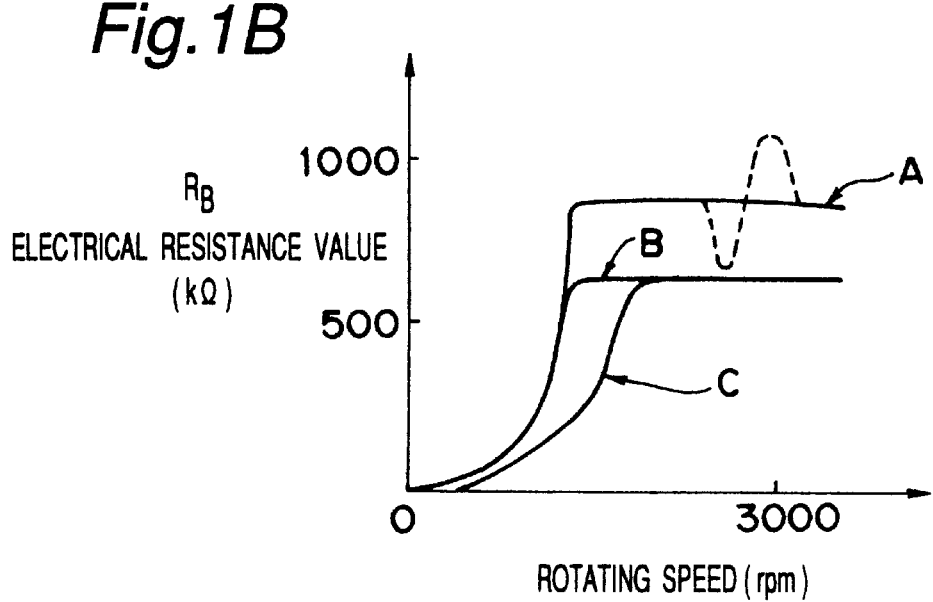
FIG. 1B is a graph of characteristics representing the results of measurement of the electrical resistance of tho fluid dynamic bearing of the above embodiment.
Figure 1C:
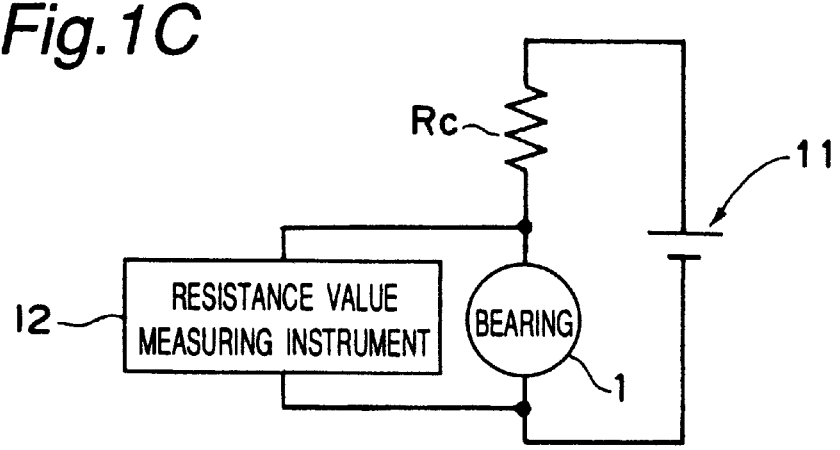
FIG. 1C is a diagram of a test circuit for use in the above embodiment.

In this embodiment, an electrical resistance value $R_B$ of the fluid dynamic bearing 1 was measured with a measurement circuit as shown in FIG. 1C. In this measurement circuit, a fixed resistor $R_c$ and the fluid dynamic bearing 1 are connected in series with a DC (Direct Current) power source 11, and a resistance value measuring instrument 12 is connected in parallel with this fluid dynamic bearing 1. This resistance value measuring instrument 12 measures the electrical resistance value of the fluid dynamic bearing 1 including the conductive oil from the value of a current flowing between the housing 2 and the shaft 3 of the fluid dynamic bearing 1 via the conductive oil and voltage drop thereof. This resistance value measuring instrument 12 can record a change in time of the measured electrical resistance value.

Next, FIG. 1B shows the measurement results of the electrical resistance value of this embodiment. A characteristic A shown in FIG. 1B represents the characteristic in the case where a clearance (radial clearance) between the dynamic pressure grooves 5 and 6 and an inner peripheral surface 2A of the housing 2 of the fluid dynamic bearing 1 is set to 4 μm and an axial perpendicularity is set to 1 μm in a steady rotation stage.

This axial perpendicularity is perpendicularity of an axial bearing surface 3A of the shaft 3 and an axial bearing surface 2B of the housing 2 with respect to an axial axis and is calculated by the sum of the perpendicularity of the axial bearing surface 3A of the shaft 3 and the perpendicularity of the axial bearing surface 2B of the housing 2.

As indicated by a characteristic A, the electrical resistance value $R_B$ increases as the rotating speed (rpm) increases. According to the characteristic A, the electrical resistance value steeply increases from the rotating speed of 0 rpm to 1000 rpm, and thereafter, the electrical resistance value is stabilized at a value of about 900 kΩ. That is, this characteristic A indicates that the radial clearance reaches approximately 4 μm (setting value) at the point of time when the rotating speed has reached about 1000 rpm so that a steady state of rotation is established.

When a fluctuation in the resistance value $R_B$ as indicated by a broken line is observed in connection with this characteristic A, it can be presumed that the radial clearance has fluctuated. When the conductive oil is deteriorated by oxidation, the resistance value $R_B$ increases, by which an increase in the resistance value $R_B$ is observed.

A characteristic B indicates a change in the resistance value in the case where the radial clearance in the steady state of rotation is set to 3 μm and the axial perpendicularity is set to 1 μm. This characteristic B rises roughly similarly to the characteristic A, and its resistance value reaches about 600 kΩ at the point of time when the rotating speed reaches about 1000 rpm and becomes stable afterwards. By comparing this characteristic B to the characteristic A, it is understood that a reduction of 1 μm of the radial clearance is equivalent to a reduction of 300 kΩ of the resistance value.

A characteristic C indicates a change in the resistance value in the case where the radial clearance in the steady state of rotation is set to 3 μm and the axial perpendicularity is set to 4 μm. This characteristic C rises later than the characteristic B, and the steady state of rotation is established at about 2000 rpm. If the characteristic C is compared with the characteristic B, then it is understood that the rotating speed at which the stability is established has been increased by about 1000 rpm as a consequence of an increase of 3 μm of the axial perpendicularity.

As described above, according to the present embodiment, the radial clearance, the axial perpendicularity, and the deterioration in the lubricant can be quantitatively evaluated, and this allows the performance evaluation of the fluid dynamic bearing to be more definitely put into practice.

The ester-based base oil that serves as the lubricant of the fluid dynamic bearing 1 may be provided by pentaerythritol besides dioctyl sebacate, while the antistatic agent may be provided by alkyl benzene sulfonate or alkyl phosphate besides alkylsulfonate salt. It is acceptable to adopt a cationic antistatic agent such as quaternary ammonium salt and amine salt or an amphoteric antistatic agent of the betaine type and the alanine type. In short, no electrostatic charge occurs when the volume resistivity of the lubricant is not greater than $5\times10^{11}$ Ω·cm, and an electrical resistance value including no turbulence can be obtained.

It should be noted that the shaft may be fixed while the housing 2 may be rotated.

As is apparent from the above, the present invention provides a fluid dynamic bearing evaluating method for evaluating a fluid dynamic bearing, comprising the steps of filling a space between a fixed member and a rotating member with an uncharged lubricant, flowing a current between the fixed member and the rotating member and measuring an electrical resistance value of the fluid dynamic bearing including the lubricant. According to the present invention, the lubricant placed between the fixed member and the rotating member is not electrically charged. Therefore, the measured electrical resistance value has a correlation with the clearance between the fixed member and the rotating member, and the clearance can be quantitatively determined by this electrical resistance value. The axial perpendicularity of the axial bearing surface of the fixed member and the axial bearing surface of the rotating member also has a correlation with the electrical resistance value, and therefore, the perpendicularity of the axial bearing surfaces can be quantitatively evaluated by this electrical resistance value. The resistance value increases when the lubricant is deteriorated by oxidation, and therefore, the degree of deterioration of the lubricant can be quantitatively evaluated by the electrical resistance value. Also, it is evaluated by the electrical resistance value whether or not foreign matters exist in the lubricant of the fluid dynamic bearing. Therefore, according to the fluid dynamic bearing evaluating method of the present invention, the operating state of the fluid dynamic bearing can be evaluated more in detail.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fluid dynamic bearing evaluating method for evaluating a fluid dynamic bearing, comprising the steps of:

filling a space between a fixed member and a rotating member with an uncharged lubricant, flowing a current between the fixed member and the rotating member, gradually increasing a rotational speed of the rotating member, measuring an electrical resistance value of the fluid dynamic bearing including the lubricant, recording the electrical resistance value of the fluid dynamic bearing changing according as the rotation speed of the rotating member is changed and evaluating the fluid dynamic bearing on the basis of the electrical resistance value of the fluid dynamic bearing and/or the rotation speed of the rotating member at a point of time when the electrical resistance value of the fluid dynamic bearing is stabilized.

2. A fluid dynamic bearing evaluating method claimed in claim 1, wherein a clearance between the fixed member and the rotating member is quantitatively evaluated based on the stabilized electrical resistance value.

3. A fluid dynamic bearing evaluating method claimed in claim 1, wherein a perpendicularity of an axial bearing surface of the fixed member and an axial bearing surface of the rotating member is quantitatively evaluated based on the rotational speed of the rotating member when the electrical resistance value of the fluid dynamic bearing is stabilized.

4. A fluid dynamic bearing evaluating method claimed in claim 1, wherein a degree of deterioration of the lubricant is quantitatively evaluated by the stabilized electrical resistance value.

5. A fluid dynamic bearing evaluating method claimed in claim 1, wherein a volume resistivity of the lubricant is not greater than $5 \times 10^{11}$ Ω·cm.

6. A fluid dynamic bearing evaluating method claimed in claim 1, wherein the lubricant comprises an ester-based base oil, an anionic antistatic agent and an amine-basedantioxidant.

7. A fluid dynamic bearing evaluating method claimed in claim 6, wherein the ester-based base oil is dioctyl sebacate or pentaerythritol.

8. A fluid dynamic bearing evaluating method claimed in claim 1, wherein the lubricant includes an antistatic agent and wherein the antistatic agent is an anionic antistatic agent, a cationic antistatic agent or an amphoteric antistatic agent.

9. A fluid dynamic bearing evaluating method claimed in claim 8, wherein the antistatic agent is alkylsulfonate salt, alkyl benzene sulfonate, alkyl phosphate, quaternary ammonium salt or amine salt.

\* \* \* \* \*